United States Patent [19]

Murakami

[11] 4,112,750
[45] Sep. 12, 1978

[54] HOOK DEVICE
[75] Inventor: Sakae Murakami, Fukuyama
[73] Assignee: Nippon Hoist Co., Ltd., Hiroshima, Japan
[21] Appl. No.: 713,803
[22] Filed: Aug. 12, 1976
[30] Foreign Application Priority Data
Aug. 12, 1975 [JP] Japan .......................... 50/111377[U]
[51] Int. Cl.² ............................ B66C 1/40; G01L 5/00
[52] U.S. Cl. .............................. 73/141 AB; 177/147; 340/666; 340/685
[58] Field of Search ............... 73/141 AB, 143; 212/2, 212/39 R; 177/147; 340/267 C, 272
[56] References Cited
U.S. PATENT DOCUMENTS
3,679,012 7/1972 Haulotte ............................ 177/147

FOREIGN PATENT DOCUMENTS
605,821 7/1948 United Kingdom ...................... 73/143

Primary Examiner—Charles A. Ruehl
Attorney, Agent, or Firm—Connolly and Hutz

[57] ABSTRACT

The present invention relates to a hook device with which safe handling operation can be assured. This device is constructed such that, as any load heavier than the predetermined weight is applied thereto, an eccentric shaft carrying a pulley for suspension thereof is rotated, and thereby an appropriate load indicating means is actuated. By use of the hook device according to this invention, a signal indicates to an operator that a load more than the predetermined level has been applied.

4 Claims, 16 Drawing Figures

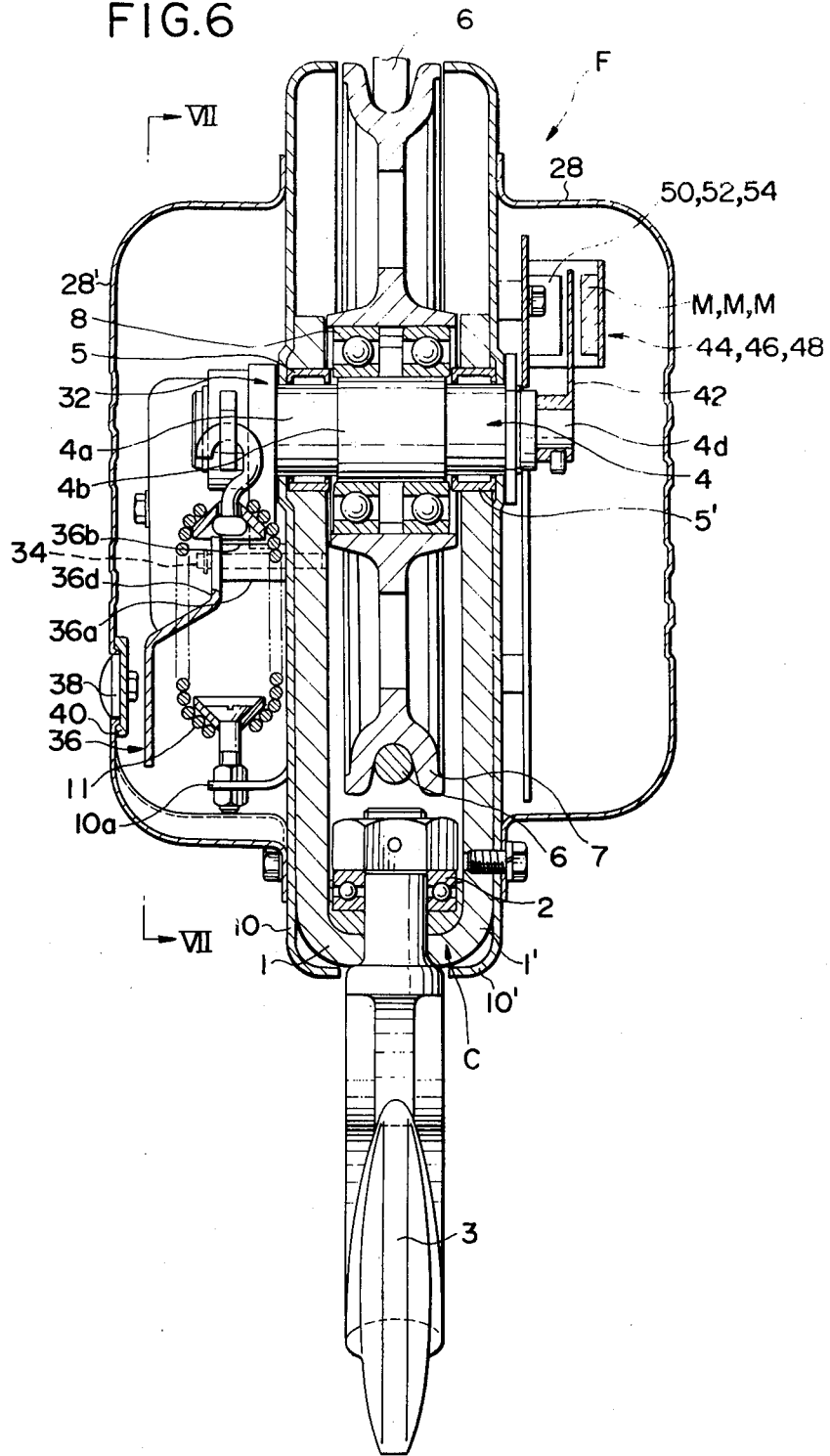

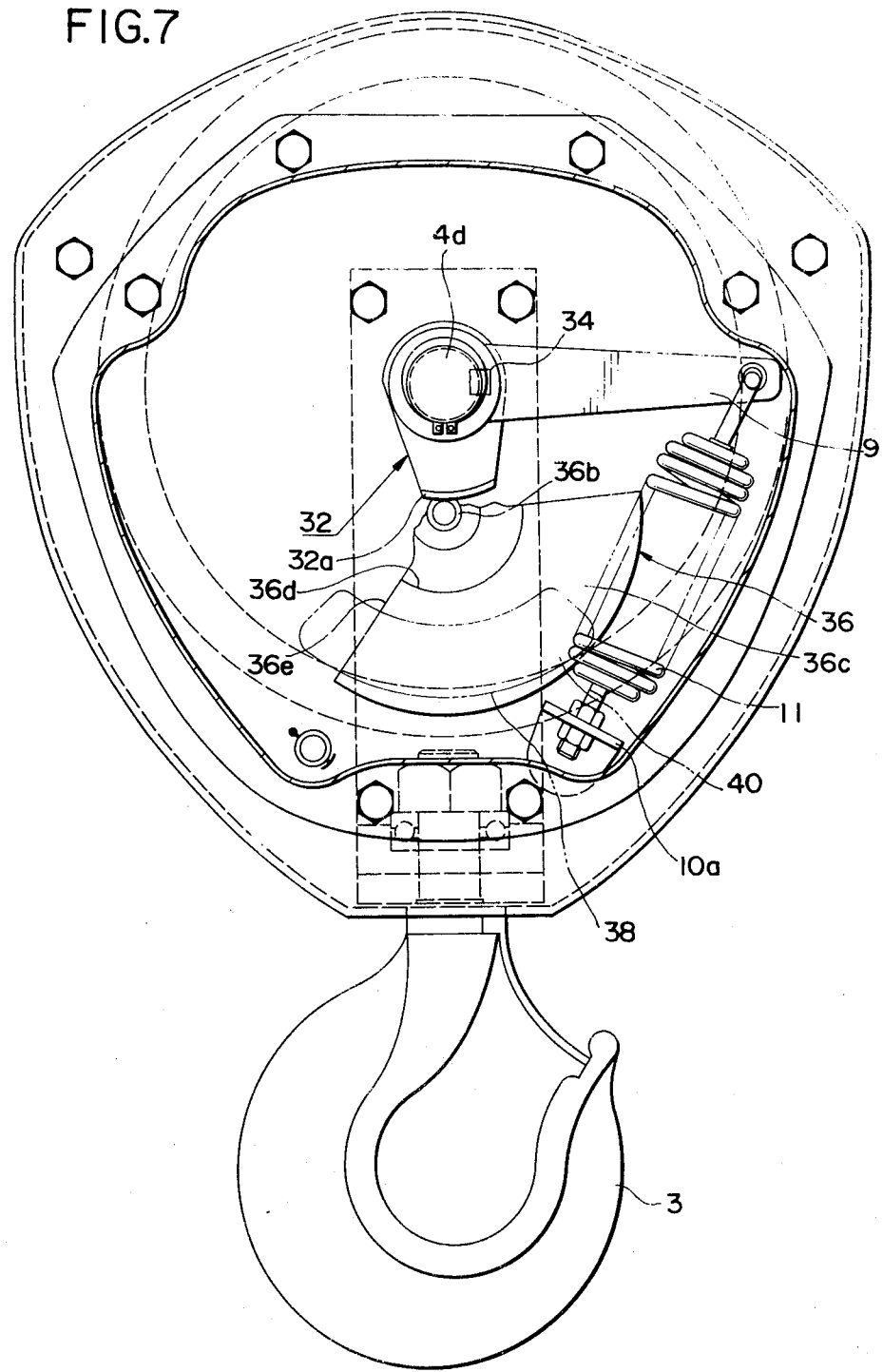

HOOK DEVICE

BACKGROUND OF THE INVENTION

1. Field of the Invention

The present invention relates to a hook device which is applicable to a hoist, crane or the like. More particularly it relates to a hook device which safety is ensured during operation.

2. Description of the Prior Art

When a hoist or a crane is put in use under overload, a breakage thereof takes place from time to time, resulting in a terrible circumstance in which the operator or other person may be injured or killed.

In the meantime, even in less terrible circumstances without such breakage there will be seen certain wear in every section of the device, as well as fatigue of wire rope and others, all of which shortens substantially durability of the device. In view of these facts, it will be very useful and practicable, if the approximate value of the suspension load could be recognized by the operator and others in the vicinity in a simple manner, for instance, by way of visual inspection, etc.. Further it will be very preferable, if any signal of alarm could be issued to them, while overload is applied, so that a dangerous situation is prevented beforehand. Moreover it will be very desirable, if the number of times when load, particularly overload, is applied could be counted so as to indicate the time when maintenance, inspection and replacement are to be performed. It has been expected for a long time that the above requirements are sufficiently and satisfactorily met.

BRIEF SUMMARY OF INVENTION

The main object of the invention is to provide a hook device for a crane, hoist or the like facilities in suspension therefrom by way of wire rope, characterized by the device quickly sensing when it is subjected to heavier load or overload so that any possible trouble is prevented from taking place with said wire and hook device.

To accomplish the above-mentioned object the hook device according to the present invention comprises a support means for supporting the hook, an eccentric shaft mounted rotatably on said support means, a pulley arranged rotatably on the eccentric portion of said eccentric shaft, a spring means for energizing said eccentric shaft in a specific direction and an indicating means to be actuated by rotation of said eccentric shaft.

The object of the present invention is to provide a hook device in which the weight of material to be lifted can be confirmed visually.

Another object of the present invention is to provide a hook device from which a signal of alarm can be issued in the event that any overload is applied thereon.

Another object of the present invention is to provide a hook device with which the time when maintenance, inspection or replacement etc. are to be carried out can be easily detected.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

The accompanying drawings illustrate embodiments of the present invention respectively, in which

FIG. 5 (b) is a simplified sectional view of a device modified from that of FIG. 5 (a), taken in the same position as in FIG. 5 (a).

FIG. 6 is a front sectional view of another embodiment of the invention.

FIG. 7 is a sectional view of the hook device taken in line VII — VII in FIG. 6.

DETAILED DESCRIPTION OF PREFERRED EMBODIMENTS

Figure 3:
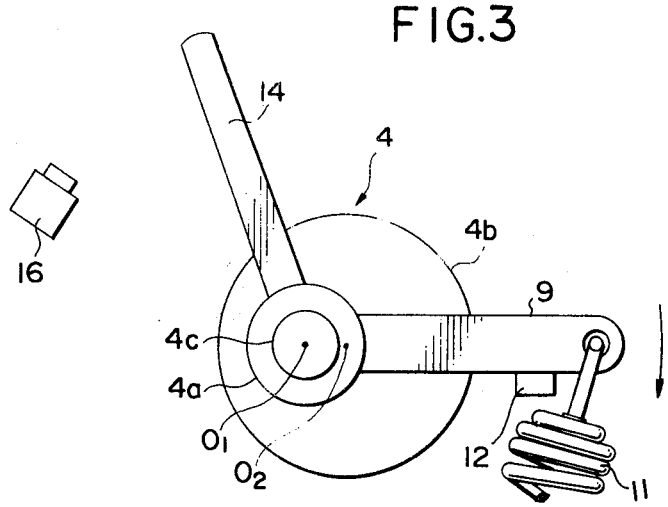
FIGS. 3 and 4 are schematical illustrations of the eccentric shaft for showing operation thereof.
Figure 4:
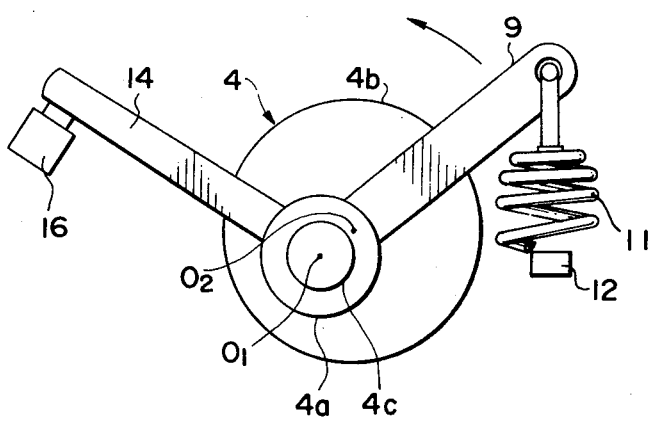

A typical construction of the hook device F according to the present invention will be explained hereinafter with reference to FIG. 1 which illustrates a front section thereof. A case C comprises a pair of support plates 1, 1' and another pair of cover plates 10, 10' set integrally to said support plates 1, 1'. At the lower end portion of the case C a hook 3 is rotatably held in suspension by way of a thrust bearing 2. An eccentric shaft 4 is rotatably arranged around at the center portion of the case C, using a pair of needle bearings 5, 5' fit therebetween. As to the eccentric shaft 4 there is provided an offset distance of eccentricity $l$ between a center axle $0_1$ of the journal portion 4a, 4a which are supported through the needle bearings 5, 5' and another center axle $0_2$ of the center shaft 4b as shown in FIG. 2. On the eccentric portion 4b of the eccentric shaft 4 a pulley 7 is journaled rotatably with a bearing 8 fit thereon. A long length of wire 6 is spun over said pulley, coming from a winding drum such as a hoist or the like. Further a lever 9 extends radially from one side of the eccentric shaft 4, that is, shaft portion 4c. One end of spring 11 is fastened to the extreme end of said lever 9, while the other end of the spring 11 is anchored onto a protrusion 10a which is fixed to the case C. Thus the eccentric shaft 4 tends to be rotated in the clockwise direction with the aid of tension by the spring 11, as illustrated in FIGS. 3 and 4. In order to prevent the lever 9 from being rotated further beyond the predetermined angle, there is provided a stopper 12 on the case C. When coming in contact with the stopper 12 (see FIG. 3), the lever 9 is not permitted to be rotated further. It is to be noted that the stopper 12 is located such that a plane involving a center axle $0_1$ of the eccentric shaft 4 and a center axle $0_2$ of the eccentric portion 4b is set horizontal.

Since the basic construction has been described as above, the duplicated explanation of the same components will be hereinafter eliminated.

In the embodiment of the invention as illustrated there is provided another lever 14 on one side of the eccentric shaft 4, that is, the journal portion 4c, said lever 14 being arranged such that it extends in the direction opposite to that of the lever 9, as shown in FIG. 2. On the case C there is also provided a limit switch to operate a buzzer, indication lamp etc.. (These being not shown here). The position of said limit switch 16 is such that the lever 14 comes in contact with the limit switch 16 at its extreme end, when the eccentric shaft 4 and the lever 14 are rotated by the predetermined angle from the position shown in FIG. 3 to the counterclockwise direction (see FIG. 4). Said predetermined angle of rotation is an angle through which the eccentric shaft 4 is rotated as the rated weight is applied onto the hook 3, as described later.

Figure 1:
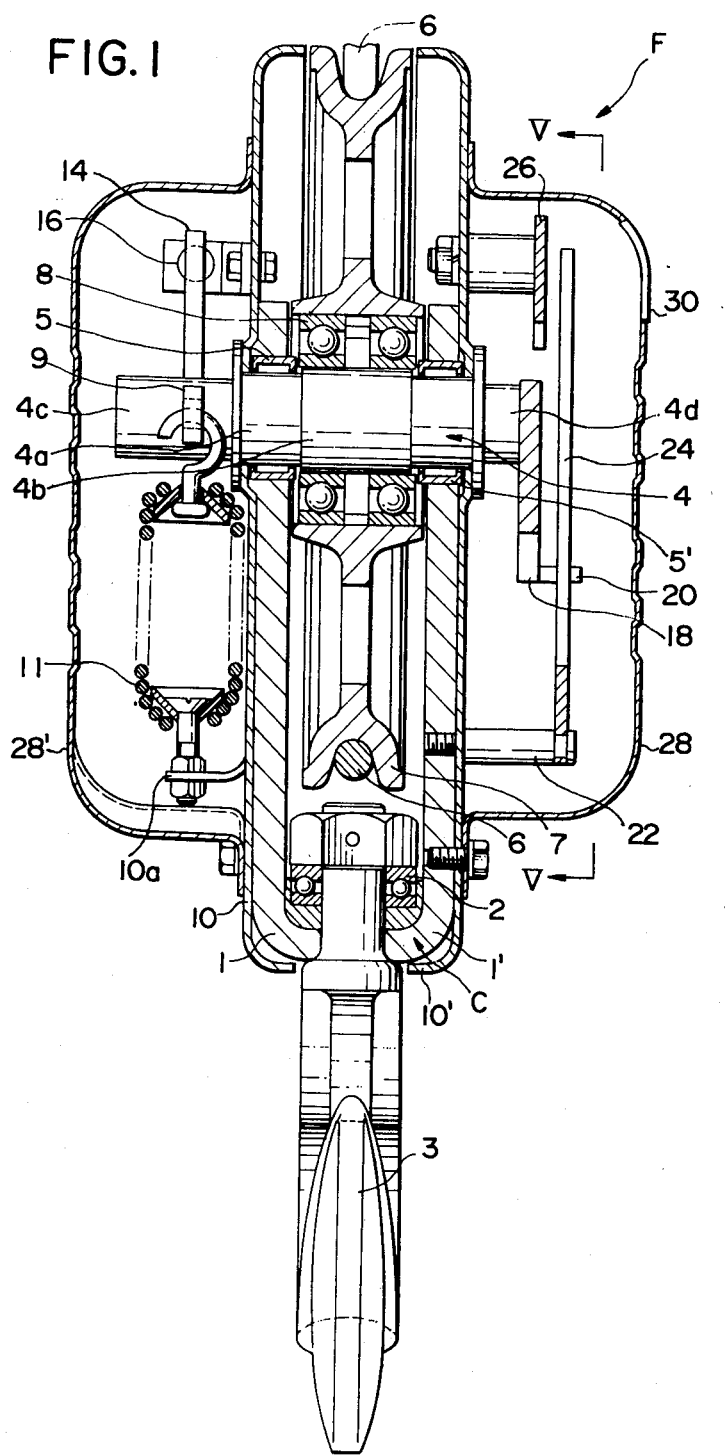
FIG. 1 is a front sectional view of a hook device according to the invention.
Figure 2:
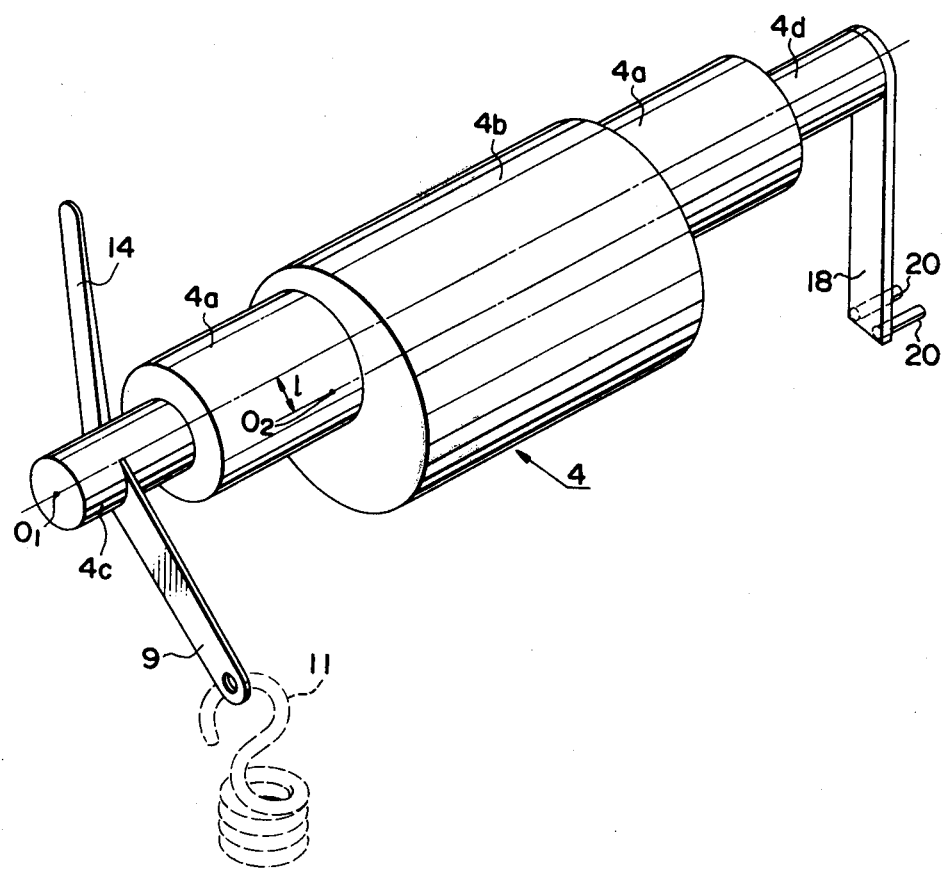
FIG. 2 is an enlarged perspective view of an eccentric shaft.
Figure 5A:
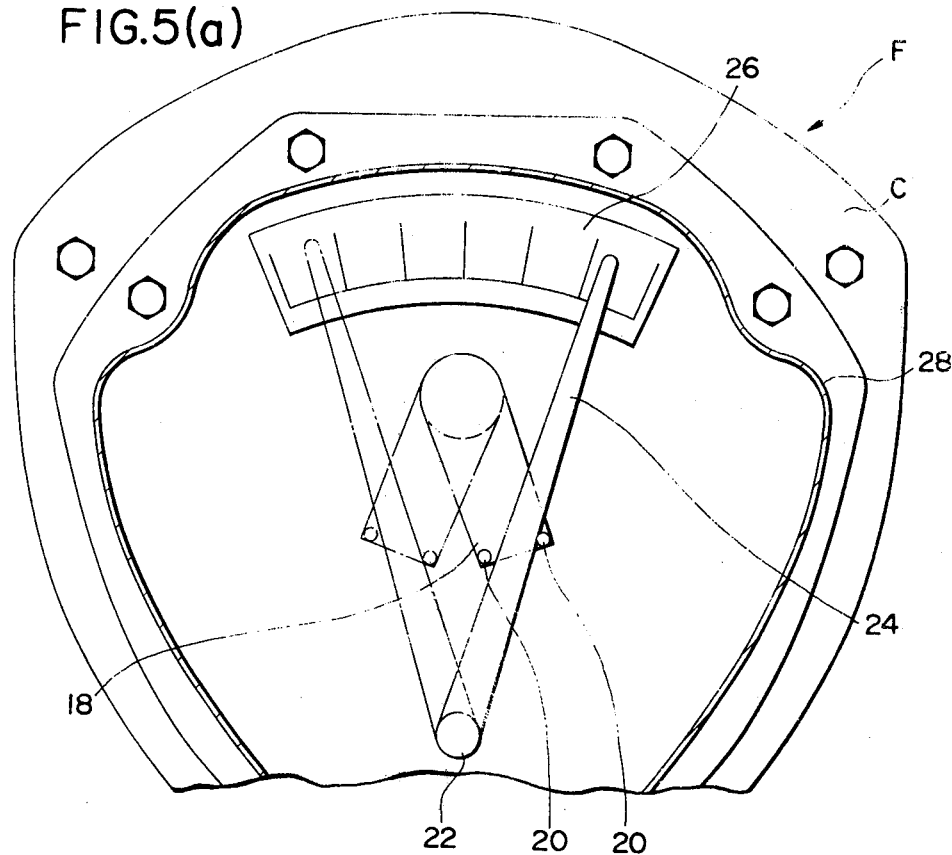
FIG. 5 (a) is a partial sectional view of the device taken in line V — V in FIG. 1, some part of said device being not shown in view of simplification.
Figure 5B:
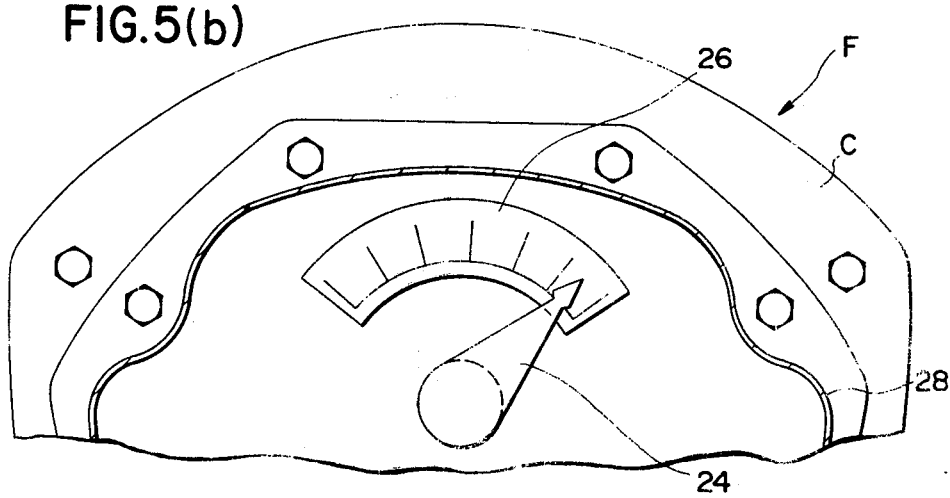

On the other side of the eccentric shaft 4, at journal portion 4d there is provided an arm 18 set integral thereto, as shown in FIGS. 1, 2 and 5 (a), said arm 18 having two pins 20, 20 studded on the both sides at the end portion thereof. A pointer 24 that is disposed rotatably on a pin 22 secured to the lower portion of the case C is arranged between said pins 20, 20, making engagement thereto. It is to be noted that the pointer 24 is arranged such that it can be rotated from the position as illustrated by the phantom line in FIG. 5 (a) to that illustrated by solid line in FIG. 5 (a) with the aid of the arm 18 as well as the pins 20, 20, as the eccentric shaft 4 is rotated from the situation as illustrated in FIG. 3 to that in FIG. 4. Adjacent to the extreme end of the pointer 24 there is provided an indication plate 26 set fast to the case C, said indication plate 26 being designed in an arched form with a center of radius at said pin 22, and having a line of calibration in weight units recessed on the surface thereof. A cover 28 is fastened to the case C so as to protect the arm 18, pointer 24 and the others from being damaged. The cover 28 is provided with an opening 30 through which the pointer 24 and the indication plate 26 are visible from outside. Further the case C is provided with another cover 28' which serves to cover said spring 11, limit switch 16 and the others in the same way as the cover 28.

When a heavy load with weight W (not shown here) is suspended on the hook 3 of the hook device F according to the invention and the wire 6 is hauled through a hoist or the like device, the hook device F is raised, while said load acts upon the hook 3 and the case C. Then a downward force equivalent to said load W is applied to the axle of the journal portion 4a of the eccentric shaft 4 arranged freely rotatable in the case C, that is, the center $0_1$ of rotation of the eccentric shaft 4. On the other hand an upward force equivalent to the load W acts on the axle $0_2$ of the eccentric portion 4b of the eccentric shaft 4 on which the pulley 7 is rotatably mounted. Now a moment is generated in magnitude $W \times l$ at the situation of the above mentioned arrangement, because the eccentric shaft 4 is located in such a manner that a plane involving said centers $0_1$ and $0_2$ lies substantially, horizontally, as above described. In other words, a moment of force exerts on the axle $0_1$ in magnitude in proportion to the active load weight W on the hook 3. Thus the eccentric shaft 4 is rotated in the counterclockwise direction in FIG. 3. this allows the arm 18 set fast to the other end of the eccentric shaft 4 to be rotated in the same direction at the same time. Then the pointer 24 in engagement between the pins 20, 20 studded to the said arm 18 at the end portion thereof is rotated about the pin 22, as the arm 18 is rotated. As a result, the eccentric shaft 4 is stopped at an angular position where the moment of force to rotate the eccentric shaft 4 in the counterclockwise direction and the moment of force to rotate the same in the clockwise direction by means of force of the spring 11 come in balance. At the same time the pointer 24 is stopped also. by reading the position of the pointer 24 on the indication plate 26 through the opening 30 in the cover 28, the real weight of said heavy load material can be determined.

In case the weight of the heavy load material exceeds the rated weight, the eccentric shaft 4 is rotated excessively, causing the extreme end of the lever 14 extending from the eccentric shaft 4 to get contacted with the limit switch 16, so that the buzzer, alarm lamp etc. is operated to signal warning to the operator and others that the heavy load material is heavier than the rated weight (limited weight). This signal of alarm ensures the operator and others to be aware of the existing dangerous state beforehand, resulting in satisfactory prevention of possible terrible situation from taking place.

Further the lever 9 connected to one end of the spring 11 may actuate directly the limit switch 16. As shown in FIG. 5 (b), the pointer 24 may be designed such that it is secured directly to the end portion of the eccentric shaft 4 to indicate the weight of the load material.

Furthermore in the above described embodiment of the invention the hook device F is provided with both indication means for the working load weight and the alarm device, but it may be provided merely with either one of said two means as required. In the illustrated embodiment the spring 11 and the load indication means are arranged separately on the both sides of the eccentric shaft 4, but they may be arranged together on either side of the same, as described later with respect to the other embodiment of the invention.

Another embodiment of the present invention will be explained hereinafter with reference to FIGS. 6 to 12. The hook device F according to this embodiment consists of an arrangement of the various counting means in addition to the load weight indicating means and overload alarm means.

In the first place the load weight indicating means will be explained with reference to FIG. 6 to 8 as follow. As illustrated in FIGS. 6 and 7 (excluding FIG. 8), a sector wheel 32 is mounted integrally onto the journal portion 4c of the eccentric shaft 4 with the aid of key 34. On the radial end portion of said sector wheel 32 there are provided a line of rack gear teeth 32a throughout the outer periphery of said end portion, while on the supporting plate 1 there is provided a pin 34 studded thereto, which serves to mount rotatably the calibrated indication plate 36 thereon through a boss portion 36a. The outer surface of said boss portion 36a forms a pinion gear 36b in engagement with said rack gear 32a of the sector wheel 32. As shown in FIG. 7, the calibrated indicating plate 36 is substantially fan-shaped. Adjacent to the outer portion 36c of said calibrated indicating plate 36, the indicating plate 36 is bent at 36d so that it is rotatable parallel to and adjacent to the cover 28'. The cover 28' encasing therein the indicating plate 36 is provided with an opening 38 in which a calibrated transparent plate 40 is spread over. The indicating plate 36 is arranged in such a manner as to face the opening 38 and the outer portion 36c thereof passes the calibration line of the transparent plate 40 inside the cover 28', as the indication plate 36 is rotated.

When a load is applied to the hook 3, the eccentric shaft 4 is rotated, as explained in the foregoing embodiment, and subsequently the indicating plate 36 is rotated by way of the sector gear plate 32, as said eccentric shaft 4 is rotated. Then the indicating plate 36 is stopped at an angular position corresponding to the magnitude of said load. At this moment, the operator can recognize the weight of the load by reading the side edge line 36e of the indicating plate 36 on the calibrated plate 40.

Next the counting means and overload alarm device will be explained below.

On a journal portion 4d of the eccentric shaft 4 there is provided a lead switch plate 42 which is mounted integrally rotatably thereon. Said lead switch plate 42 is made of any material that is capable of shielding the magnetic beam, for instance, silicon steel plate or the like.

Figure 8:
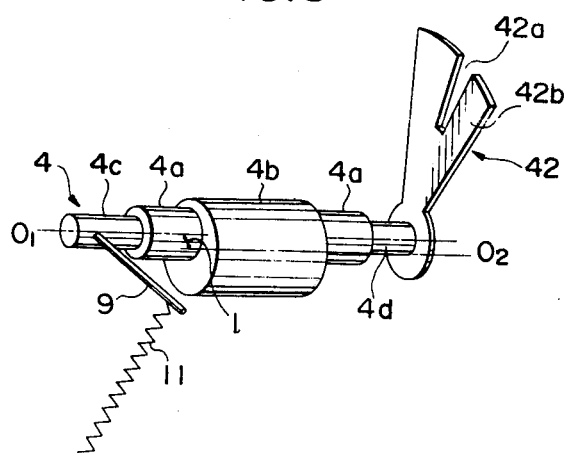
FIG. 8 is another perspective view of the eccentric shaft.

As illustrated in FIG. 8, the lead switch plate 42 is substantially fan-shaped and radially slit at 42a. Magnetic line of power is emitted from magnet M in lead switch is 44, 46, 48 to pass through said slit portion 42a of the lead switch plate 42, while other portion 42b of the lead switch plate 42 serves to shield coming magnetic line of power.

Figure 11:
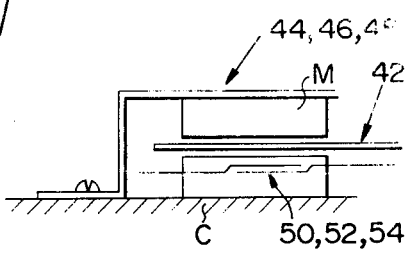
FIG. 11 is an enlarged sectional view showing the construction of the lead switches, and FIG. 12 (a) to (d) are an enlarged front view illustrating the lead switch plate at the rest position.
Figure 12A:
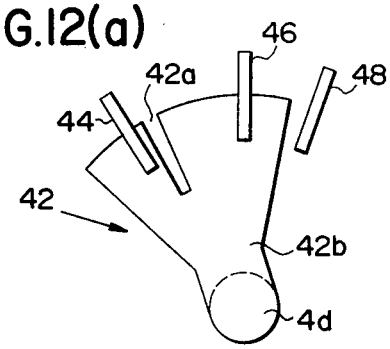
Figure 12B:
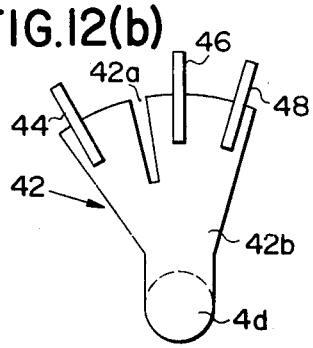
Figure 12C:
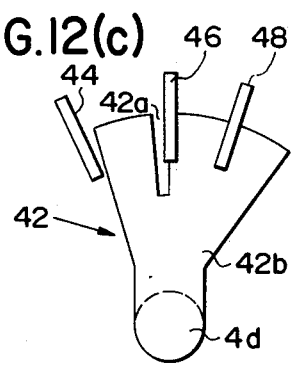
Figure 12D:
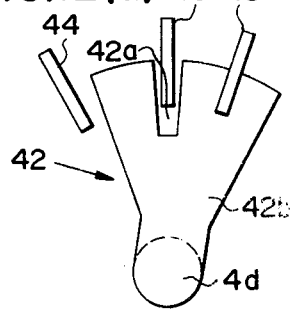

Said lead switch is 44, 46 and 48 are disposed at the predetermined distance outside the case C along the outer periphery of the lead switch plate 42 which is rotatable about the axle $0_1$. As shown in FIG. 11, the lead switch is 44, 46 and 48 are constructed such that a magnetically permeable member having a contact encased therein is set fast to the outer surface of the case C and a permanent magnet M is arranged opposite to said magnetically permeable member at certain distance therefrom. Thus magnetic line of power is shut off or passed through the slit portion 42a by locating the lead switch plate 42 in alignment with said slit portion 42a between said permeable member and permanent magnet M, so that contacts 50, 52 and 54 are turned on or off.

Figure 9:
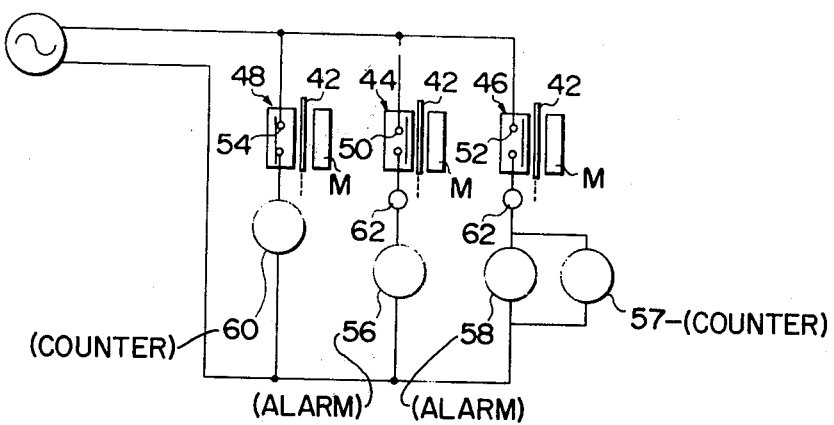
FIG. 9 is a circuit diagram illustrating an arrangement of each lead switch in case a lead switch plate shuts off a magnetic line of force.

Referring to FIG. 9, the lead switch 44 is provided with the normally opened contact 50. Alarm device 56 (alarm bell which issues intermittent sound is used in this embodiment) is operated only when said contact 50 becomes closed, that is, when the lead switch 44 allows magnetic line of power to pass through the corresponding slit portion 42a. As the operator hears sound of warning from the alarm device 56, he knows that a load having weight equivalent to 90% of the rated load is applied to the hook 3. It will be obvious that adjustment can be made as required such that the alarm device 56 is operated when load equivalent to any determined percentage of the rated load is applied to the hook device F.

The lead switch 46 is provided also with the normally opened contact 52 and is operated in the same way as said lead switch 44. Said lead switch 46 permits a counter 57 connected to this circuit to be operated so as to register times when the applied load exceeds the rated one. The lead switch 46 permits also an alarm device 58 (alarm bell which issues intermittent sounds in this embodiment) to be operated so that a signal of warning is issued to let the operator know that a heavy article in excess of the rated weight is applied to the hook 3.

The lead switch 48 is also provided with the normally opened contact 54 and allows a counter 60 connected to the circuit to be operated only when the contact 54 becomes closed, that is, when the lead switch plate 42 shuts magnetic line of power emitted from the permanent magnet M of the lead switch 48. This counter 60 ensures to register the operation times of the hook device F, irrespective of the magnitude of the load applied to the hook 3.

Figure 10:
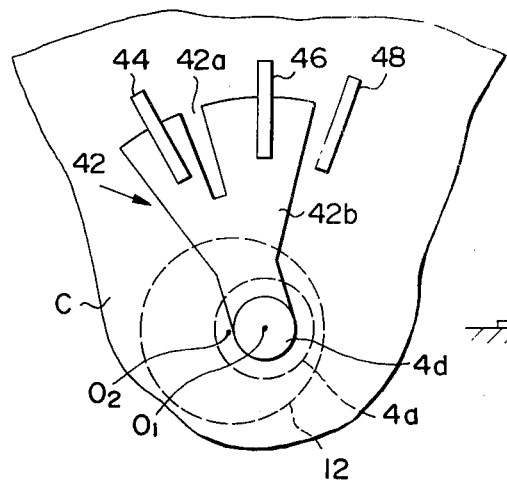
FIG. 10 is an enlarged front view illustrating an arrangement of the lead switch plate and the lead switches.

It should be noted that these lead switches 44, 46 and 48 in FIG. 10 are ready to be operated only when the lead switch plate 42 is rotated in the clockwise direction (while a heavy article is hung on the hook 3), but they are not operable when the lead switch plate 42 is rotated in the counterclockwise direction (which is the case that the heavy article is removed from the hook 3).

Now referring to FIG. 9, numerals 62, 62 are malfunction preventive apparatus which serves to delay transference of the signal to the counter 57 and alarm device 56 by certain length of time required to reach a stable state of the lead switch plate 42 in a standstill.

It is to be additionally noted that the hook device F is provided with dry cells (not shown) for actuating the alarm device etc. as power supply in both the above described embodiments. To make sure whether the capacity of the dry cell is adequate or not there is provided a check button or check lamp (each of which is not shown here) in the hook device F.

When load is applied to the hook 3, the lead switch plate 42 is rotated together with the eccentric shaft 4, and comes to a standstill at the same angular position as that of the eccentric shaft 4. Since the position where the lead switch plate 42 is stopped varies in accordance with the magnitude of said load, the hook device F according to the present invention accomplishes its given function, accompanied by the following steps of operation as explained below.

FIG. 12 (a) shows the position of the lead switch plate 42 during no load applied to the hook 3. At this moment the lead switch plate 42 shuts off the magnetic line of power coming from the lead switches 44 and 46, while it allows the contact 50, 52 to be turned off. As to the lead switch 48 magnetic line of power is emitted freely and then causes the contacts 54 to be turned off. Accordingly the counters 57, 60 as well as the alarm devices 56, 58 are not operated respectively at said position.

FIG. 12 (b) shows the position of the lead switch plate 42 brought to a standstill when the weight of the load applied to the hook 3 is less than the rated load. The lead switch plate 42 is rotated by some angle from the position under no load, so that the magnetic line of power emitted by all of the lead switches 44, 46 and 48 is shut off, resulting in the contacts 50, 52 still in the OFF position in the same way as above described and the contact 54 turned to the ON position. This enables the counter 60 to be actuated so as to register the number of times when the hook device F is operated.

FIG. 12 (c) shows another position of the lead switch plate 42 which is rotated further. As to the lead switch 44 magnetic line of power is freely emitted therefrom, while it is shut off with the lead switches 46, 48. Particularly the lead switch 46 is located in alignment with either side of the split portion 42a of the lead switch plate 42.

In this case, the contact 50 of the lead switch 44 is turned on, while the contact 52 of the lead switch 46 is turned off. Thereby the alarm device 56 is operated to issue a signal of warning that the load applied to the hook 3 reaches 90% of the rated load.

FIG. 12 (d) shows further another position of the lead switch 42 in a standstill in case that the weight of the load applied to the hook 3 exceeds the rated load. In this case the lead switch 46 is located within the split portion 42a of the lead switch plate 42, causing the magnetic line of power to pass freely therethrough with a result that the contact 52 is turned on.

In this case, therefore, the alarm device is operated to issue a signal of warning to the operator and other persons that the weight of the load applied to the hook 3 exceeds the rated load. At the same time the counter 57 is actuated to register the number of times of operation where the applied load on the hook device F exceeds the rated load.

As the heavy article is disconnected from the hook 3, the eccentric shaft 4 is rotated counterclockwise to restore the initial position thereof.

In the meantime, the lead switch plate 42 is rotated in the clockwise direction to shut off the magnetic line of power coming from the lead switches 44, 46 and 48 respectively. As above mentioned, however, the lead switches 44, 46 and 48 are constructed such that they are not operated during rotation in the counterclockwise direction, and therefore the counters 57, 60 as well as the alarm devices 56, 58 do not operate.

The hook device F is not required to be provided with all of load weight indicating device, overload alarm devices and counter devices for this embodiment in the same way as in the foregoing embodiment. This means that the hook device F may be equipped optionally with one or two of said devices as required.

Since the hook device F according to the present invention is constructed to be operated in the above mentioned manner, it will have various kind of effects as described below, when it is put in use.

(1) In the hook device F equipped with the load weight indicating device, operators and others can recognize visually the working load on the hook 3 with the aid of said indicating device.

Thus in the event heavy load or overload is applied, operators and others can recognize the dangerous situation very quickly. They can carry out handling operations to prevent a possible accident.

Further a fact that only proper magnitude of suspension load is applicable will improve substantially durability of not only the hook device F but also the hoist and the crane. Moreover, as it is possible to estimate content and state of suspension load with the hook device F, the improvement of working efficiency and economy can be expected.

(2) In case the hook device F is provided with an overload alarm device, it issues a signal of warning, as the working load on the hook 3 exceeds the predetermined weight. This ensures preventing the lifting of excessively heavy article unconsciously. Thereby breakage of wire 6 and failure of hook device F or hoist etc. can be prevented. Consequently physical trouble on human body, for instance, the operator or a neighboring person can be prevented.

(3) In case the hook device F is provided with counter device, the hook device F is able to register the number of times when overload exerted on the hook device F and/or the number of times when the hook device F was put in use. Thus the operator can foresee the existing state of wearing or breakage of the hook 3, wire 6 etc. based on the registered results. This enables the operator to carry out periodical inspection and maintenance in an appropriate period of time. Accordingly safety is assured for the hook device F even it is operated for a long period of time.

(4) Other features and advantages of the hook device F according to the present invention are as follows.

(a) The hook device F is applicable to any of the hoists and the likes (irrespective of new or old type or model) only by spanning the wire 6 over the pulley 7. Moreover no connecting operation to power supply will be required, in case it is provided with dry cells. This ensures the hook device F to be very easily mounted.

(b) Comparing with the conventional hook devices, the hook device F according to the present invention has no loss in respect of lifting stroke and reacts properly against any severe load such as impact load, biased load, vibration and others, resulting in safe handling at all time.

(c) Its simple construction ensures the hook device F to be designed and manufactured in a compact size and light weight. It requires no special technique for its handling.

What is claimed is:

1. Hook device applicable to a crane, a hoist or the like device characterized by that said hook device comprises:
   (a) a support means for supporting a hook,
   (b) an eccentric shaft mounted rotatably on said support means,
   (c) a pulley arranged rotatably on the eccentric portion of said eccentric shaft,
   (d) a spring means connected to said shaft for urging said eccentric shaft in a specific direction, and
   (e) a load indicating means connected to said eccentric shaft, said load indicating means being operable by rotation of said eccentric shaft when a load in excess of a predetermined weight is applied to said shaft, said load indicating means comprising an arm set fast to said eccentric shaft, two pins studded onto said arm, a pointer arranged rotatably on said support means, said pointer being between said pins for engagement with said pins whereby rotation of said shaft causes said pins to move with the movement of said pins thereby causing said pointer to rotate, an indication plate set fast to said support means, and said indication plate being located corresponding to the range of rotation of said pointer.

2. Hook device as set forth in claim 1, wherein said load indicating means comprises a lever extending radially from one side of said eccentric shaft, an alarm device, and switch means in the path of motion of said lever for actuating said alarm device in accordance with the movement of said lever.

3. Hook device applicable to a crane, a hoist or the like device comprising:
   (a) support means for supporting a hook,
   (b) a shaft mounted rotatably on said support means and having an eccentric portion,
   (c) a pulley arranged rotatably on said eccentric portion of said shaft,
   (d) a first lever extending radially from the portion of said shaft concentric with the axis of rotation, spring means for urging said shaft in a direction oposite the direction urged by a load acting on the hook, one end of said spring means reacting against a portion of said first lever radially spaced from said shaft, the other end of said spring means reacting against said support means, (e) a second lever extending radially from a portion of said shaft concentric with said axis of rotation, said second lever having a path of motion in accordance with the rotation of said shaft, switch means on said support means in said path of motion of said second lever when said shaft rotates in the direction urged by the load whereby said second lever contacts and actuates said switch means when said second lever is moved to a predetermined position, alarm means on said support means actuatable by said switch means upon actuation of said switch means by said second lever, and (f) said first lever and said second lever being at an angle to each other whereby said angle and the mounting of said spring means and of said switch means with respect to the lengths of said first and second levers determines when said alarm means will be actuated.

4. Hook devise as set forth in claim 3, wherein a load indicating plate is mounted on said support means, and load indicating means extending from said shaft for indicating on said plate an amount indicative of the load in accordance with the rotation of said shaft.

* * * * *